United States Patent [19]

DeKezel et al.

[11] 4,450,642
[45] May 29, 1984

[54] BUOYANT WATER FOWL DECOY

[76] Inventors: James A. DeKezel, 2300 79th Ave. West, Lot 97, Rock Island, Ill. 61201; James R. Lerschen, 218 Elm St., Colona, Ill. 61241

[21] Appl. No.: 397,551

[22] Filed: Jul. 12, 1982

[51] Int. Cl.³ .......................................... A01M 31/06
[52] U.S. Cl. ....................................................... 43/3
[58] Field of Search ....................... 43/2, 3; 46/91, 92, 46/124

[56] References Cited

U.S. PATENT DOCUMENTS

| | | | |
|---|---|---|---|
| 2,134,891 | 11/1938 | Reinhart . | |
| 2,222,996 | 11/1940 | Armstrong . | |
| 2,256,778 | 9/1941 | Lundgren . | |
| 2,453,758 | 11/1948 | Risch | 43/3 |
| 2,651,873 | 9/1953 | Risch . | |
| 2,814,898 | 12/1957 | Fluke | 43/3 |
| 2,816,384 | 12/1957 | Rexius | 43/3 |
| 2,880,544 | 4/1959 | Crummer . | |
| 2,893,154 | 7/1959 | McKee | 43/3 |
| 3,103,199 | 9/1963 | Gagnon | 114/221 R |
| 3,704,538 | 12/1972 | Gagnon | 43/3 |
| 4,023,297 | 5/1977 | Jorgensen . | |

FOREIGN PATENT DOCUMENTS 327063  3/1930  United Kingdom ...................... 43/3

OTHER PUBLICATIONS

Unsinkable Chanti Decoys, "Field and Stream", Jan. 1959, p. 23.

Primary Examiner—Nicholas P. Godici
Assistant Examiner—Marc Hodak
Attorney, Agent, or Firm—Thomas R. Vigil

[57] ABSTRACT

The water fowl decoy includes a body comprised of a rigid plastic outer shell filled with buoyant foam plastic material and a depending weighted keel comprised of a rigid plastic shell filled with concrete and having throughbores at each end thereof for receiving anchor ropes or stakes.

8 Claims, 4 Drawing Figures

BUOYANT WATER FOWL DECOY

FIELD OF THE INVENTION

The present invention relates to water fowl decoys such as duck and goose decoys and to a method for making same.

DESCRIPTION OF THE PRIOR ART

Heretofore various decoy constructions have been proposed including a decoy comprised of a canvas shell over a wood body, or filled with cork or kapok, a rubber shell over a wood body, a plastic sealed shell or a buoyant plastic foam body.

The canvas and cork or wood and rubber decoys required a significant amount of manual labor to produce and did not lend themselves to mass production techniques.

The plastic sealed shell decoy works well except that when the integrity of the seal has been broken, the decoy often becomes waterlogged and sinks. This is particularly so when the decoy is hit with buckshot.

The plastic foam decoy works well but is not very rugged and is particularly susceptible to being destroyed when hit by buckshot.

Examples of previous proposed decoys are disclosed in the following patents:

| U.S. PAT. NO. | PATENTEE |
|---|---|
| 2,134,891 | Reinhart, Jr. |
| 2,222,996 | Armstrong |
| 2,256,778 | Lundgren |
| 2,651,873 | Risch et al. |
| 2,880,544 | Crummer et al. |
| 4,023,297 | Jorgensen |

The Reinhart, Jr. U.S. Pat. No. 2,134,891 discloses a duck decoy comprising a fabric casing filled with a buoyant material such as ground cork, kapok or the like.

The Armstrong U.S. Pat. No. 2,222,996 discloses a decoy made of pieces of fabric material such as canvas or the like which is stuffed with a body portion made of pieces of ground cork shel together by shellac. A tab is provided for an anchor rope.

The Lundgren U.S. Pat. No. 2,256,788 discloses a decoy which includes a buoyant body made of filler material surrounded by a casing made of canvas or other suitable fabric and which has a stake mounted in the body and extending from the bottom for holding the decoy in an upright position when the stake is thrust into the ground.

The Risch et al. U.S. Pat. No. 2,651,873 discloses a molded decoy which is made of a hollow molded body of fibrous material such as paper pulp. The shell of the body and the shell of the head may be impregnated with asphalt or tar and an attachment means is provided for an anchor rope in the form of a ring at the end of an eyelet screwed into the underside of the body.

The Crummer et al. U.S. Pat. No. 2,880,544 discloses a decoy comprising a wooden body having a resilient or rubber cover thereover.

The Jorgensen U.S. Pat. No. 4,023,297 discloses a decoy having a main body shell and a lower body shell with a depending lug having a passageway therethrough for an anchor rope. Front and rear lugs are provided on one embodiment of a goose decoy for receiving stakes for securing the goose decoy in position on the ground.

As will be described in greater detail hereinafter, the decoy of the present invention differs from these previously proposed decoys by providing a water fowl decoy having a rigid outer plastic shell with buoyant foam plastic material within the shell. Also, in one embodiment, the decoy of the present invention has a weighted keel and throughbores at each end of the keel for receiving anchor ropes or stakes.

SUMMARY OF THE INVENTION

According to the invention there is provided a water fowl decoy comprising a shell which is made of a rigid plastic material and which has the shape of a water fowl and a buoyant foam plastic material within said rigid plastic shell.

Further according to the invention there is provided a water fowl decoy comprising a shell body portion which has the shape of a water fowl and which is made of a rigid plastic material, a keel shell portion which is made of a rigid plastic material and which depends from said shell body portion, a buoyant foam plastic material within said shell body portion, and concrete material within said keel shell portion.

DESCRIPTION OF THE PREFERRED EMBODIMENT(S)

Figure 1:
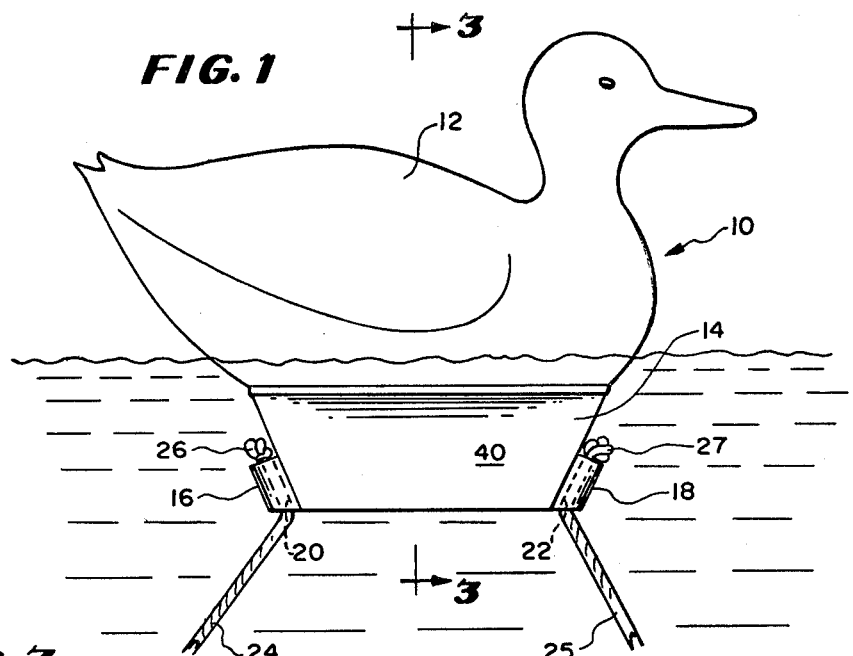
FIG. 1 is a side elevational view of a water fowl decoy constructed in accordance with the teachings of the present invention and is shown anchored in water.

Referring now to FIG. 1 there is illustrated therein a duck decoy 10 constructed in accordance with the teachings of the present invention. Although a duck shape is shown for the decoy 10 it is to be understood that the decoy 10 can have the shape of other water fowl, e.g., the shape of a Canadian goose.

The decoy 10 includes a body 12 in the shape of a duck, and a keel 14 fixed to and depending from the underside of the body 12.

Figure 2:
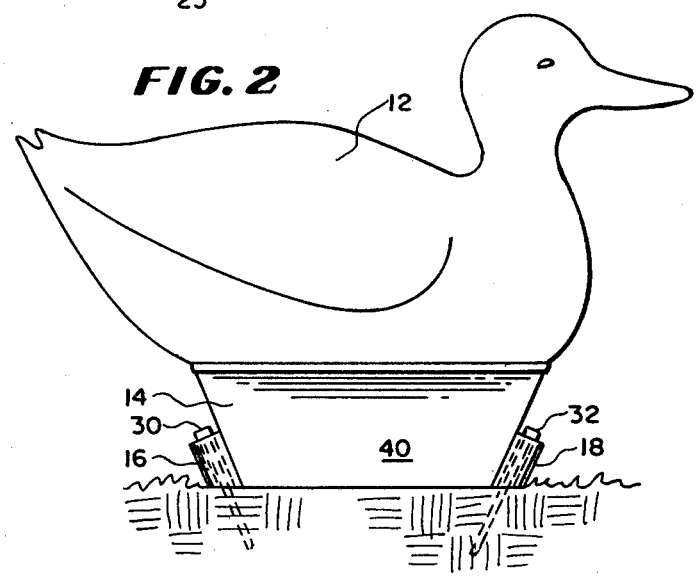
FIG. 2 is a side elevational view of the water fowl decoy similar to the view shown in FIG. 1 and shows the decoy anchored on land.
Figure 4:
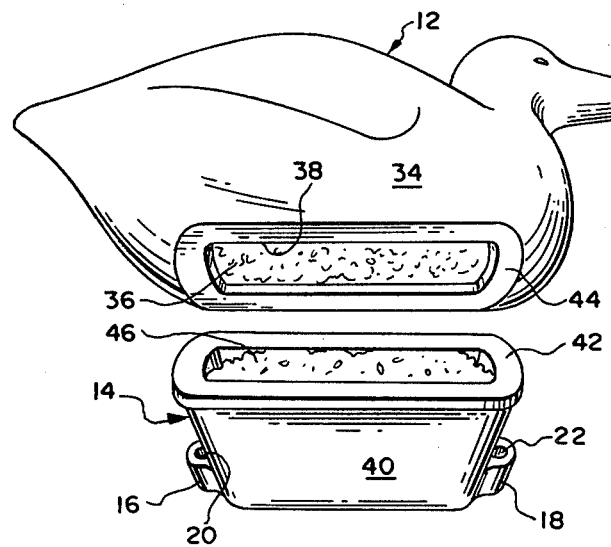
FIG. 4 is a perspective view of the decoy shown in FIG. 1 with the keep separated from the body to show the manner in which the keel is fixed to the body.

As shown in FIGS. 1, 2 and 4, the keel 14 has a forward boss 16 and a rearward boss 18 on the forward and rearward edges of the keel 14. Each boss 16 and 18 has a throughbore, 20, 22 therethrough which forms an anchoring structure. In this respect, as shown in FIG. 1, anchor ropes 24 and 25 are received through the bores 20 and 22 and are knotted at their upper ends 26, 27 to form stops which abut against the upper edge of the bosses 16 and 18 thereby to anchor the decoy 10 in water. Of course, weights (not shown) are attached to the other ends of the ropes 24 and 25.

The keel 14 has a depth of approximately three (3) inches so that when the decoy 10 is placed on land as shown in FIG. 2, the body 12 of the decoy 10 is at a desired height as a standing duck would be. Also the bores 20 and 22 in the bosses 16 and 18 now serve to receive stakes 30 and 32 therethrough for fixing the decoy 10 on land in an upright position.

Figure 3:
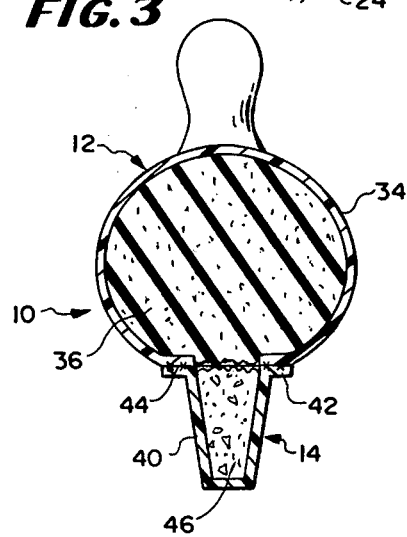
FIG. 3 is a vertical sectional view and is taken along line 3—3 of FIG. 1.

In accordance with the teachings of the present invention and as shown in FIG. 3, the body 12 is made of a rigid shell 34 which is filled with a buoyant foam plastic material 36 and which has the coloring of a particular water fowl. If desired, the shell 34 can be hand painted.

The shell 34 is preferably 0.125 inch thick and is made of a thermal plastic material such as the material sold under the trademark E-1000 Renflex by Triangle Plastics, Inc.

The buoyant foam material 36 is injected into the shell 34 through a suitable opening therein, such as through a bottom opening 38 (FIG. 4). The foam material is preferably a polyurethane foam system based on a polymeric isocyanate of the type sold under the trademark ISOFOAM R0380B by Witco Chemical Corporation.

The keel 14 includes a rigid plastic shell 40 having a closed bottom and being open at the top. A mounting flange 42 extends laterally from the top of the shell 40 for fixing the shell 40 to a planar bottom surface 44 surrounding the bottom opening 38 in the shell 34 of the body 12. The keel shell 40 is filled with heavy material, i.e., is "weighted". Preferably such heavy material 46 is concrete which is inexpensive and easy to insert into the keel shell 40.

Referring now to FIG. 4, it will be apparent that once the body shell 34 has been filled with buoyant foam plastic material 36 which has been allowed to cure and set, and once the keel shell 40 has been filled with concrete which also has been allowed to dry and set, the flange 42 and/or the planar bottom surface 44 are coated with an adhesive and pressed or held together until the adhesive sets or dries.

It is to be understood that the use of a buoyant foam plastic material 36 can also be used to rehabilitate existing decoys of the type having a hollow sealed shell where the integrity of the shell has been broken, such as by buckshot. In this respect, according to the teachings of the present invention such a decoy can be salvaged by practicing the method of the present invention comprising the steps of: providing an opening in the shell body of the decoy; filling the shell with a buoyant foam plastic material; and, allowing the foam plastic material to cure and set. Also, of course, such rehabilitated decoy can be fitted with a keel like the keel 14.

From the foregoing description it will be appreciated that the water fowl decoy 10 of the present invention has a number of advantages, some of which have been described above and others of which are inherent in the invention. More specifically, the decoy 10 is easy and inexpensive to manufacture, is always right-side-up by reason of the keel 14 and anchoring means-it will maintain itself in wind and waves by reason of the keel 14, and will always float notwithstanding buckshot holes in the body 12 thereof because of the buoyant material 36 within the shell 34.

Also it will be apparent that modifications can be made to the decoy 10 without departing from the teachings of the present invention. For example, the body 12 and keel 14 can be made or mounted as one piece with keel 14 initially open at the bottom. Then, foam plastic material is inserted through the opening in the bottom of keel 14 into body 12 and allowed to harden. Then, after the foam plastic material hardens, cement is inserted into keel 14 and allowed to harden into concrete. Accordingly, the scope of the present invention is only to be limited as necessitated by the accompanying claims.

We claim:

1. A water fowl decoy comprising: a hollow shell body portion which has the shape of a water fowl and which is made of a hard rigid plastic material, a keel shell portion which is made of a hard plastic material, which depends from said shell body portion and which defines with said shell body portion communicating interior chambers, a buoyant foam plastic material within said interior chamber of said shell body portion, and concrete material within said interior chamber of said keel shell portion.

2. The decoy of claim 1 wherein said keel shell portion has a boss at each end thereof with each boss having a bore therethrough which extends in the same direction as the vertical axis of said keel shell portion, each boss with a bore therethrough defining an anchor rope attachment means or a stake receiving means for anchoring said decoy at both ends in water or for mounting said decoy on land in an upright manner with stakes being received through said bores in said bosses.

3. The decoy of claim 1 wherein said keel shell portion is made of a molded rigid plastic shell which has an open upper end, a lower closed end and a flange surrounding the open upper end, said flange being secured by a suitable adhesive to a mating surface on the underside of said water fowl-shaped body shell portion.

4. The decoy of claim 1 wherein said keel shell portion includes a molded rigid plastic shell which is attached to the underside of said body shell portion and which is filled with concrete.

5. The decoy of claim 1 wherein said buoyant plastic material is made from a polyurethane foam system based on a polymeric isocyanate.

6. The decoy of claim 1 wherein said body shell portion includes a hollow shell, is initially separate from said keel shell portion, and has an opening in the bottom thereof, said bottom having a flat planar surface surrounding said opening and forming a mating surface with a flange on the upper edge of said keel shell portion and said keel shell portion being attached to said body shell portion by means of an adhesive placed between said bottom flat planar surface and an upper surface of said flange of said keel portion.

7. The decoy of claim 1 wherein said keel shell portion has a depth of approximately three (3) inches.

8. The decoy of claim 1 wherein said shell body portion and said keel shell portion are made as a single piece with said keel shell portion having a bottom opening which is initially open, said foam plastic material being first inserted through said keel shell portion bottom opening into said body portion and allowed to harden and then cement being inserted through said bottom opening into said keel shell portion and allowed to harden into concrete.

* * * * *